United States Patent
Chaar et al.

(10) Patent No.: US 12,250,422 B2
(45) Date of Patent: *Mar. 11, 2025

(54) DYNAMICALLY SCHEDULING NON-PROGRAMMING MEDIA ITEMS IN CONTEXTUALLY RELEVANT PROGRAMMING MEDIA CONTENT

(71) Applicant: Turner Broadcasting System, Inc., Atlanta, GA (US)

(72) Inventors: Wassim Samir Chaar, Coppell, TX (US); José Antonio Carbajal Orozco, Atlanta, GA (US); Andreea Popescu, Atlanta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,900

(22) Filed: Jun. 13, 2023

(65) Prior Publication Data

US 2024/0064358 A1 Feb. 22, 2024

Related U.S. Application Data

(63) Continuation of application No. 16/895,304, filed on Jun. 8, 2020, now Pat. No. 11,700,406, which is a
(Continued)

(51) Int. Cl.
*H04N 21/262* (2011.01)
*G06F 16/48* (2019.01)
(Continued)

(52) U.S. Cl.
CPC ....... *H04N 21/26241* (2013.01); *G06F 16/48* (2019.01); *G06F 40/247* (2020.01);
(Continued)

(58) Field of Classification Search
CPC .......... H04N 21/26241; H04N 21/2187; G06F 40/279; G06F 40/247; G06F 40/30; G06F 16/48; H04H 20/28; G06Q 30/0241
See application file for complete search history.

(56) References Cited

U.S. PATENT DOCUMENTS 6,947,450 B2  9/2005  Mangin
7,873,541 B1  1/2011  Klar et al.
(Continued)

FOREIGN PATENT DOCUMENTS

CA   2330297 A1   8/2000
WO   00/51335 A2  8/2000
(Continued)

OTHER PUBLICATIONS

Non-Final Office Action in U.S. Appl. No. 14/930,599 dated Aug. 28, 2018.
(Continued)

*Primary Examiner* — Pinkal R Chokshi
(74) *Attorney, Agent, or Firm* — ALSTON & BIRD LLP

(57) ABSTRACT

A system is provided that extracts contextual keywords from contextual data of programming media content based on a mapping of the contextual data of the programming media content with stored keywords or event information associated with semantics of the programming media content. A plurality of potential non-programming media items is determined from a plurality of non-programming media items for a plurality of users, based on a match between a sentiment type of each of the plurality of non-programming media items and the extracted contextual keywords. Based on a set of constraints, a schedule for insertion of a potential non-programming media item is generated at a candidate spot in the programming media content at run time.

20 Claims, 6 Drawing Sheets

Related U.S. Application Data continuation of application No. 15/865,716, filed on Jan. 9, 2018, now Pat. No. 10,834,451.

(51) Int. Cl.
| | | |
|---|---|---|
| *G06F 40/247* | (2020.01) | |
| *G06F 40/279* | (2020.01) | |
| *G06F 40/30* | (2020.01) | |
| *H04H 20/28* | (2008.01) | |
| *H04H 60/06* | (2008.01) | |
| *H04N 21/2187* | (2011.01) | |
| *G06Q 30/0241* | (2023.01) | |

(52) U.S. Cl.
CPC ............ *G06F 40/279* (2020.01); *G06F 40/30* (2020.01); *H04H 20/28* (2013.01); *H04H 60/06* (2013.01); *H04N 21/2187* (2013.01); *G06Q 30/0241* (2013.01)

(56) References Cited

U.S. PATENT DOCUMENTS

| | | | |
|---|---|---|---|
| 8,401,897 | B1 | 3/2013 | Chatterjee |
| 8,516,515 | B2 | 8/2013 | Zigmond et al. |
| 8,544,036 | B2 | 9/2013 | Bollapragada et al. |
| 8,973,023 | B1 | 3/2015 | Rao et al. |
| 9,147,198 | B2 | 9/2015 | Emans et al. |
| 9,396,180 | B1 | 7/2016 | Salvador et al. |
| 9,652,510 | B1 | 5/2017 | Huang et al. |
| 9,668,002 | B1 | 5/2017 | Baron et al. |
| 10,219,048 | B2 | 2/2019 | Kunisetty et al. |
| 10,299,008 | B1 | 5/2019 | Catalano et al. |
| 10,834,451 | B2 | 11/2020 | Chaar et al. |
| 11,216,828 | B2 | 1/2022 | Littlejohn et al. |
| 11,700,406 | B2 | 7/2023 | Chaar et al. |
| 2003/0188308 | A1 | 10/2003 | Kizuka |
| 2005/0171897 | A1 | 8/2005 | Forsythe et al. |
| 2006/0253323 | A1 | 11/2006 | Phan et al. |
| 2006/0259455 | A1 | 11/2006 | Anderson et al. |
| 2007/0033623 | A1 | 2/2007 | Fredrickson et al. |
| 2007/0083885 | A1 | 4/2007 | Harding |
| 2007/0156525 | A1 | 7/2007 | Grouf et al. |
| 2007/0204310 | A1* | 8/2007 | Hua ................... H04N 21/6587 |
| | | | 348/E7.071 |
| 2007/0239536 | A1 | 10/2007 | Bollapragada |
| 2007/0288979 | A1 | 12/2007 | Yen |
| 2008/0189178 | A1 | 8/2008 | Schepers et al. |
| 2008/0189734 | A1 | 8/2008 | Schepers et al. |
| 2008/0201188 | A1 | 8/2008 | Heyman et al. |
| 2008/0250447 | A1 | 10/2008 | Rowe et al. |
| 2008/0263578 | A1 | 10/2008 | Bayer et al. |
| 2008/0263583 | A1 | 10/2008 | Heath |
| 2009/0006145 | A1 | 1/2009 | Duggal et al. |
| 2009/0070211 | A1 | 3/2009 | Gonen |
| 2009/0106082 | A1 | 4/2009 | Senti et al. |
| 2009/0144168 | A1 | 6/2009 | Grouf et al. |
| 2009/0150224 | A1 | 6/2009 | Lu et al. |
| 2009/0254932 | A1 | 10/2009 | Wang et al. |
| 2009/0276317 | A1 | 11/2009 | Dixon et al. |
| 2010/0023408 | A1 | 1/2010 | Mc Neill |
| 2010/0042496 | A1 | 2/2010 | Wang et al. |
| 2010/0088719 | A1 | 4/2010 | Hawkins et al. |
| 2010/0146542 | A1 | 6/2010 | Weihs et al. |
| 2011/0078740 | A1 | 3/2011 | Bolyukh et al. |
| 2011/0093343 | A1 | 4/2011 | Hatami-Hanza |
| 2011/0119136 | A1 | 5/2011 | Eldreth et al. |
| 2011/0161162 | A1 | 6/2011 | Ketchum |
| 2011/0288907 | A1* | 11/2011 | Harvey .............. G06Q 10/0639 |
| | | | 705/7.29 |
| 2012/0042338 | A1 | 2/2012 | Kitts et al. |
| 2012/0191541 | A1 | 7/2012 | Yang et al. |
| 2013/0097629 | A1 | 4/2013 | Popescu et al. |
| 2013/0151340 | A1 | 6/2013 | Barbieri et al. |
| 2013/0166395 | A1 | 6/2013 | Vassilvitskii et al. |
| 2013/0205339 | A1 | 8/2013 | Haberman et al. |
| 2013/0219427 | A1 | 8/2013 | Zundel et al. |
| 2013/0254787 | A1 | 9/2013 | Cox et al. |
| 2014/0006118 | A1 | 1/2014 | Charania |
| 2014/0046661 | A1 | 2/2014 | Bruner |
| 2014/0047473 | A1* | 2/2014 | Sankaran ........... H04N 21/4532 |
| | | | 725/34 |
| 2014/0074591 | A1 | 3/2014 | Allen et al. |
| 2014/0082660 | A1 | 3/2014 | Zhang et al. |
| 2014/0109123 | A1 | 4/2014 | Balakrishnan et al. |
| 2014/0143032 | A1 | 5/2014 | Tomlin et al. |
| 2015/0039395 | A1 | 2/2015 | Denslow et al. |
| 2015/0089540 | A1 | 3/2015 | Kitts et al. |
| 2015/0143404 | A1* | 5/2015 | Byers ................. G06Q 30/0207 |
| | | | 725/32 |
| 2015/0186403 | A1 | 7/2015 | Srivastava et al. |
| 2015/0269632 | A1 | 9/2015 | Ledwich et al. |
| 2015/0319510 | A1 | 11/2015 | Ould et al. |
| 2015/0348091 | A1* | 12/2015 | Haberman ......... G06Q 30/0244 |
| | | | 705/14.43 |
| 2015/0365735 | A1* | 12/2015 | Kunisetty .......... H04N 21/8455 |
| | | | 725/32 |
| 2015/0373387 | A1 | 12/2015 | Chaar et al. |
| 2016/0037197 | A1 | 2/2016 | Kitts et al. |
| 2016/0117718 | A1 | 4/2016 | Hood et al. |
| 2016/0246765 | A1 | 8/2016 | Hundemer |
| 2016/0357362 | A1* | 12/2016 | Gauci ...................... G06N 5/04 |
| 2017/0213469 | A1* | 7/2017 | Elchik ...................... G09B 7/02 |
| 2017/0289600 | A1 | 10/2017 | Carbajal et al. |
| 2020/0004743 | A1 | 1/2020 | Huang et al. |

FOREIGN PATENT DOCUMENTS

| | | |
|---|---|---|
| WO | 01/07985 A2 | 2/2001 |
| WO | 2006/097826 A2 | 9/2006 |
| WO | 2013/055982 A2 | 4/2013 |

OTHER PUBLICATIONS

Non-Final Office Action in U.S. Appl. No. 15/091,475 dated Sep. 28, 2018.

Non-Final Office Action in U.S. Appl. No. 15/621,147 dated Jan. 15, 2019.

Non-Final Office Action in U.S. Appl. No. 15/621,151 dated Jan. 15, 2019.

Non-Final Office Action in U.S. Appl. No. 15/621,151 dated Sep. 16, 2021.

Non-Final Office Action in U.S. Appl. No. 16/026,422 dated Jan. 22, 2019.

Notice of Allowance for U.S. Appl. No. 14/842,808 dated Jan. 19, 2021.

Notice of Allowance for U.S. Appl. No. 14/930,559 dated Feb. 16, 2021.

Notice of Allowance for U.S. Appl. No. 15/091,475 dated Dec. 7, 2021.

Notice of Allowance for U.S. Appl. No. 16/026,422 dated May 28, 2019.

Notice of Allowance for U.S. Appl. No. 15/621,151 dated Apr. 5, 2022.

Notice of Allowance for U.S. Appl. No. 17/340,149 dated Jan. 24, 2023.

Notice of Allowance for U.S. Appl. No. 17/678,700 dated Oct. 13, 2022.

Notice of Allowance in U.S. Appl. No. 14/842,799 dated Apr. 17, 2018.

Notice of Allowance in U.S. Appl. No. 14/842,799 dated Jun. 15, 2018.

Notice of Allowance in U.S. Appl. No. 14/842,799 dated May 10, 2018.

Notice of Allowance in U.S. Appl. No. 14/930,586 dated May 18, 2018.

Notice of Allowance in U.S. Appl. No. 14/930,586 dated May 2, 2018.

(56) References Cited

OTHER PUBLICATIONS

Notice of Allowance in U.S. Appl. No. 14/930,586 dated May 24, 2018.
Notice of Allowance in U.S. Appl. No. 16/026,422 dated Mar. 15, 2019.
Office Action in U.S. Appl. No. 14/842,808 dated Mar. 21, 2018.
Reddy, S., Aronson, J., Stam, A., 1998. Spot: Scheduling programs optimaly for television. Management Science 44 (1), 83-102.
Supplemental Notice of Allowance for U.S. Appl. No. 14/842,808 dated Apr. 21, 2021.
Supplemental Notice of Allowance for U.S. Appl. No. 14/842,808 dated Jun. 10, 2021.
Supplemental Notice of Allowance for U.S. Appl. No. 14/930,559 dated Mar. 17, 2021.
Supplemental Notice of Allowance for U.S. Appl. No. 14/930,559 dated May 19, 2021.
Supplemental Notice of Allowance for U.S. Appl. No. 15/091,475 dated Jan. 18, 2022.
Advisory Action for U.S. Appl. No. 14/930,559 dated May 6, 2019.
Advisory Action for U.S. Appl. No. 15/621,147 dated Oct. 21, 2019.
Advisory Action for U.S. Appl. No. 15/621,151 dated Oct. 3, 2019.
Advisory Action in U.S. Appl. No. 15/091,475 dated Jun. 12, 2019.
Araman & Popescu, "Media Revenue Management with Audience Uncertainty: Balancing Upfront and Spot Market Sales", Spring 2010, Manufacturing & Service Operations Management, vol. 12, No. 2, pp. 190-212 (Year: 2010).
Bertsimas, D., Tsitsiklis, J., 1997. Introduction to Linear Optimization. Athena Scientific, Belmont, Massachusetts.
Bollaparagda et al., "Managing On-Air Ad Inventory in Broadcast Television," IIE transactions 40.12 (2008), pp. 1107-1123.
Bollapragada et al., "NBC-Universal uses a novel qualitative forecasting technique to predict advertising demand," Interfaces 38.2 (2008): 103-111.
Bollapragada, S., Bussieck, M., Mallik, S., 2004. Scheduling commercial videotapes in broadcast television. Operations Research 52 (5), 679-689.
Bollapragada, S., Cheng, H., Phillips, M., Scholes, M., Gibbs, T., Humphreville, M., 2002. Nbc's optimization systems increase its revenues and productivity. Interfaces 32 (1), 47-60.
Bollapragada, S., Garbiras, M., 2004. Scheduling commercials on broadcast television. Operations Research 52 (3), 337-345.
Corrected Notice of Allowance for U.S. Appl. No. 15/091,475 dated Mar. 3, 2022.
Corrected Notice of Allowance for U.S. Appl. No. 15/621,147 dated Feb. 10, 2022.
Corrected Notice of Allowance for U.S. Appl. No. 15/621,147 dated Nov. 24, 2021.
Corrected Notice of Allowance for U.S. Appl. No. 15/621,147 dated Nov. 26, 2021.
Corrected Notice of Allowance for U.S. Appl. No. 15/865,716 dated Aug. 28, 2020.
Corrected Notice of Allowance for U.S. Appl. No. 15/865,716 dated Oct. 7, 2020.
Corrected Notice of Allowance for U.S. Appl. No. 16/026,422 dated Aug. 22, 2019.
Corrected Notice of Allowance for U.S. Appl. No. 16/026,422 dated May 14, 2019.
Corrected Notice of Allowance for U.S. Appl. No. 16/026,422 dated Oct. 30, 2019.
Corrected Notice of Allowance for U.S. Appl. No. 17/678,700 dated Jan. 19, 2023.
Corrected Notice of Allowance for U.S. Appl. No. 17/850,376 dated Jan. 19, 2023.
Corrected Notice of Allowance in U.S. Appl. No. 14/930,586 dated Aug. 1, 2018.
Corrected Notice of Allowance in U.S. Appl. No. 14/930,586 dated Jul. 3, 2018.
Corrected Notice of Allowance in U.S. Appl. No. 16/026,422 dated Jun. 10, 2019.
Danaher, P., Dagger, T., 2012. Using a nested legit model to forecast television ratings. International Journal of Forecasting 28 (3), 607-622.
Danaher, P., Dagger, T., Smith, M., 2011. Forecasting television ratings. International Journal of Forecasting 27 (4), 1215-1240.
Final Office Action for U.S. Appl. No. 14/842,808 dated Dec. 12, 2019.
Final Office Action for U.S. Appl. No. 14/930,559 dated Feb. 7, 2020.
Final Office Action for U.S. Appl. No. 15/091,475 dated Apr. 16, 2020.
Final Office Action for U.S. Appl. No. 15/091,475 dated Feb. 18, 2021.
Final Office Action for U.S. Appl. No. 15/621,147 dated Jul. 29, 2019.
Final Office Action for U.S. Appl. No. 15/621,147 dated Sep. 4, 2020.
Final Office Action for U.S. Appl. No. 15/621, 151 dated Aug. 7, 2020.
Final Office Action for U.S. Appl. No. 15/621, 151 dated Jul. 16, 2019.
Final Office Action in U.S. Appl. No. 14/842,808 dated Sep. 10, 2018.
Final Office Action in U.S. Appl. No. 14/930,559 dated Feb. 25, 2019.
Final Office Action in U.S. Appl. No. 15/091,475 dated Mar. 28, 2019.
Horen, J., 1980. Scheduling of network television programs. Management Science 26 (4), 354-370.
International Search Report and the Written Opinion of the International Searching Authority, or the Declaration, in International application No. PCT/US12/59857, dated Jan. 4, 2013. (11 pages).
Non-Final Office Action for U.S. Appl. No. 14/842,808 dated Jun. 12, 2020.
Non-Final Office Action for U.S. Appl. No. 14/842,808 dated May 31, 2019.
Non-Final Office Action for U.S. Appl. No. 14/930,559 dated Aug. 21, 2020.
Non-Final Office Action for U.S. Appl. No. 14/930,559 dated Aug. 22, 2019.
Non-Final Office Action for U.S. Appl. No. 15/091,475 dated Aug. 21, 2020.
Non-Final Office Action for U.S. Appl. No. 15/091,475 dated Oct. 3, 2019.
Non-Final Office Action for U.S. Appl. No. 15/621,147 dated Mar. 6, 2020.
Non-Final Office Action for U.S. Appl. No. 15/621,151 dated Feb. 6, 2020.
Non-Final Office Action for U.S. Appl. No. 17/340,149 dated Sep. 26, 2022.
Non-Final Office Action for U.S. Appl. No. 17/692,533 dated Apr. 26, 2023.

* cited by examiner

DYNAMICALLY SCHEDULING NON-PROGRAMMING MEDIA ITEMS IN CONTEXTUALLY RELEVANT PROGRAMMING MEDIA CONTENT

CROSS-REFERENCE TO RELATED APPLICATIONS/INCORPORATION BY REFERENCE

This patent application makes reference to, claims priority to, claims the benefit of, and is a Continuation application of U.S. patent application Ser. No. 16/895,304, filed on Jan. 9, 2018, which is further a Continuation application of U.S. Pat. No. 10,834,451, issued on Nov. 10, 2020.

The above referenced application is hereby incorporated herein by reference in its entirety.

FIELD OF TECHNOLOGY

Certain embodiments of the disclosure relate to media items scheduling and packaging system. More specifically, certain embodiments of the disclosure relate to a method and system for dynamically scheduling non-programming media items in contextually relevant programming media content.

BACKGROUND

Typically, distribution sources deliver programming media content, such as live video feed or video-on-demand (VOD) assets, to various consumer devices in a network. Such programming media content delivery is in accordance with a programming schedule, which defines what to broadcast and when, ensuring an adequate or maximum utilization of airtime. Accordingly, the programming media content is packaged into brands and organized into channels to be delivered to the consumer devices in the network.

Further, such distribution sources also package non-programming media items in such programming media content and strive to increase their appeal in order to gain wider impact. However, in certain scenarios, the buckets for such non-programming media items in the programming media content are pre-determined, and thus, may not be targeted to the preferences, likes, or dislikes of users. In such scenarios, such non-programming media items may be mostly irrelevant, thus, less impactful and less effective. Therefore, there may be desired an advanced system with an ability to schedule the non-programming media items in the programming media content in an impactful, effective, and relevant manner for an enhanced user experience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or a method are provided for dynamically scheduling non-programming media items in contextually relevant programming media content, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
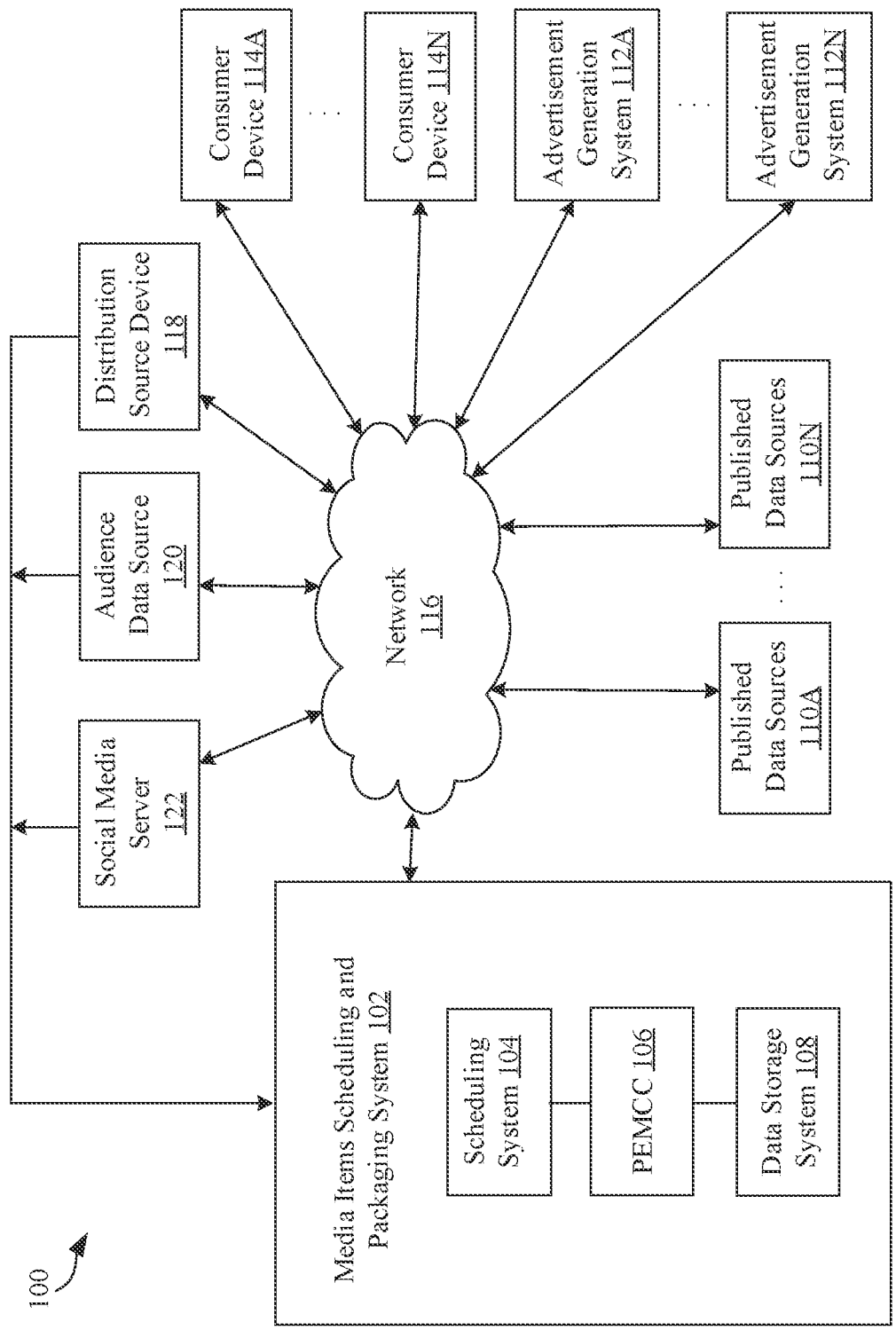
FIG. 1 is a block diagram that illustrates an exemplary system for dynamically scheduling non-programming media items in programming media content, in accordance with an exemplary embodiment of the disclosure.

Certain embodiments of the disclosure may be found in a system and method for dynamically scheduling non-programming media items in contextually relevant programming media content. Various embodiments of the disclosure provide a system and method that dynamically generates a schedule of non-programming media items in the programming media content for various candidate spots based on contextual data extracted from programming media content and sentiment type of each of the non-programming media items. This may provide an enhanced user experience with increased impact of the dynamically scheduled non-programming media items.

A media items scheduling and packaging system may comprise one or more circuits that may be configured to extract contextual data from program-specific information. The program-specific information may be associated with a programming media content of a channel received from a distribution source device over a network. The program-specific information may correspond to closed captions associated with the programming media content of the channel. The programming media content may correspond to at least one of a live feed or pre-stored video-on-demand (VOD) assets. The program-specific information associated with the programming media content of the channel may be parsed based on a plurality of natural language processing techniques. In accordance with an embodiment, an analysis of the extracted contextual data may be based on content recognition detection of the programming media content of the channel. The one or more circuits may be configured to map the extracted contextual data in the programming media content based on a thesaurus database. The contextually relevant data may be mapped with the keywords or event information in the thesaurus database to further extract keywords from the contextually relevant data of the programming media content.

The one or more circuits may be further configured to determine a plurality of potential non-programming media items based on a match between a sentiment type of each of the plurality of non-programming media items and the extracted contextual data. Each of the plurality of non-programming media items is associated with at least one of a programming media content source, media item information, a plurality of users, and playback duration. The one or more circuits may be further configured to determine the sentiment type of each of the plurality of non-programming media items based on a match between media metadata associated with each of the plurality of non-programming media items and a vocabulary database.

Based on at least the extracted contextual data and the sentiment type of each of the determined plurality of media items, a plurality of candidate spots in the video feed may be determined. In accordance with an embodiment, the one or more circuits are configured to detect an upcoming inbound trigger in the video feed for the determination of the plurality of candidate spots in the video feed.

The one or more circuits may be further configured to dynamically generate a schedule of at least one non-programming media item for at least one candidate spot in the programming media content of the channel to be viewed at the plurality of consumer devices, based on at least a set of constraints and user estimation data associated with the plurality of users. The dynamically generated schedule of the at least one non-programming media item at the at least one candidate spot may be further based on social media data associated with social media behavior of a plurality of users associated with the plurality of consumer devices. The set of constraints may comprise at least one of a count of non-programming media items to be inserted for a defined time duration of the video feed, a minimum or maximum count of non-programming media items that correspond to a programming media content source, programming media content identifier to differentiate between similar product items corresponding to different brands, break duration limits, or time separation.

In accordance with an embodiment, the one or more circuits may be configured to determine an engagement index of the plurality of users associated with the plurality of consumer devices. The plurality of consumer devices may receive the video feed that includes the dynamically generated schedule of the at least one non-programming media item for the at least one candidate spot. The determined engagement index for the plurality of users may be objectively quantified to emphasize on metrics and statistics associated audience retention and impact translation for different topics associated with the programming media content. The determined engagement index may be optimized to reflect on an increased return of investment (ROI) for the non-programming media items, such as the advertisements, displayed based on the generated dynamic schedule.

FIG. 1 is a block diagram that illustrates an exemplary system for dynamically scheduling non-programming media items in programming media content, in accordance with an exemplary embodiment of the disclosure. Referring to FIG. 1, the system 100 comprises a media items scheduling and packaging system 102. The media items scheduling and packaging system 102 further comprises a scheduling system 104, a pre-encoded media content converter (PEMCC) 106 (e.g. a stitcher), and a data storage system 108. The media items scheduling and packaging system 102 is communicatively coupled to a plurality of published data sources 110A, ..., 110N, a plurality of advertisement generation systems 112A, ..., 112N, and a plurality of consumer devices 114A, ..., 114N, via a network 116. There is also shown a distribution source device 118, an audience data source 120, and a social media server 122 communicatively coupled to the media items scheduling and packaging system 102, via the network 116.

The media items scheduling and packaging system 102 may comprise suitable logic, circuitry, and interfaces that may be configured to execute code that schedules and distributes one or more channels to be viewed on the plurality of consumer devices 114A, ..., 114N. The media items scheduling and packaging system 102 may be operated by a distribution source, which may be referred to as a broadcast provider or operator, or a network provider or operator. The broadcast provider may handle a single channel or a plurality of channels, or one or more networks. The broadcast provider may be configured to distribute (e.g. multicast, broadcast and simulcast) content via one or more platforms, for example, traditional over-the-air broadcast channels, cable television networks, satellite communication networks, the Internet, and/or other content delivery networks (CDNs).

The scheduling system 104 may comprise suitable logic, circuitry, and interfaces that may be configured to execute a code that dynamically generates a schedule of non-programming media items, such as promotional content, in programming media content, for example a video feed, of a channel. The generated schedule of a channel defines what non-programming media item should be scheduled at which candidate spot, based on various factors, such as topics of the programming media content, sentiment types of the non-programming media items, a plurality of constraints, user estimation data, and social media data. The channel that is distributed may include both programming media content, such as TV programs, and non-programming media items, such as advertisements and promotional media. In accordance with an embodiment, the schedule may be a text file or an XML file, that comprise a reference mapping of different non-programming media items that needs to be inserted in the programming media content by the PEMCC 106. The scheduling system 104 may receive an original schedule of an existing channel from the distribution source device 118. The scheduling system 104 may modify the received schedule to dynamically generate a new schedule driven by the aforesaid factors in real time or near-real time.

The PEMCC 106 may comprise suitable logic, circuitry, and interfaces that may be configured to execute code to insert a plurality of non-programming media items at the plurality of candidate spots in the programming media content, in accordance with the dynamically generated schedule. Accordingly, the PEMCC 106 generates a specific program stream to be delivered to one or more of the plurality of consumer devices 114A, ..., 114N. The dynamic generation of the schedules is driven in real time or near-real time, as described in FIGS. 3A and 3B.

The data storage system 108 may comprise suitable logic, circuitry, and interfaces that may be configured to store pre-encoded VOD content segments, live content segments, and program-specific information related to the pre-encoded VOD content segments and the live content segments. The data storage system 108 may also store, process, and generate aggregate viewing information (for target audience) based on various data feed received from the audience data source 120 and the published data sources 110A, ..., 110N. The data storage system 108 may also store non-programming media items provided by the plurality of advertisement generation systems 112A, ..., 112N. The data storage system 108 may also store a thesaurus database and a vocabulary database. The thesaurus database may include phrases and keywords associated with semantics (or language) of the programming media content. The contextually relevant data may be mapped with the keywords or event information in the thesaurus database to further extract keywords from the contextually relevant data of the programming media content. The vocabulary database may correspond to a mood vocabulary and may include sentiment types associated with non-programming media items.

Each of the plurality of published data sources 110A, . . . , 110N may comprise suitable logic, circuitry, and interfaces that may be configured to execute code that provides actual audiences for programs (comprising the programming media content) in the one or more channels that were aired by the broadcasting source. As illustrated in FIG. 1, the plurality of published data sources 110A, . . . , 110N are coupled to the media items scheduling and packaging system 102, via the network 116. The plurality of published data sources 110A, . . . , 110N may provide actual audiences for the programs to the data storage system 108. An exemplary published data source may be Nielsen®, a ratings measurement system, which provides data, such as ratings and audience size, for a programming media content. Another exemplary published data source may be gross rating point (GRP) that is an advertising or a promotion impact measure corresponding to each advertising and/or promotional campaign. It may be noted that the above published data sources, known in the art, have been mentioned for exemplary purposes and should not be construed to limit the scope of the disclosure.

The plurality of advertisement generation systems 112A, . . . , 112N may comprise suitable logic, circuitry, and interfaces that may be configured to place orders of non-programming media items, such as advertisement, promotional content, or creatives, with a media items scheduling and packaging system 102 of a distribution source (such as a broadcast provider), via the network 116. Such orders may comprise airing constraints and placement requirements corresponding to the plurality of candidate spots in the programming media content. The airing constraints corresponding to each of the plurality of candidate spots may comprise, for example, one or more of network constraints, selling title constraints, inventory utilization type constraints, allowable date and time constraints, and advertiser conflict constraints.

The plurality of consumer devices 114A, . . . , 114N may refer to end-user devices where the programming media content is played to be received by a user. The number of impressions of a media item, such as an advertisement and/or promotional media, on such plurality of consumer devices 114A, . . . , 114N is an exemplary parameter that may indicate the advertising impact or promotion impact and number of actual audiences achieved during campaigns. Examples of the plurality of consumer devices 114A, . . . , 114N may include, but are not limited to multimedia devices, such as televisions and smart devices (for example smartphones and tablets).

The network 116 may be any kind of network, or a combination of various networks, and it is shown illustrating the communication that may occur between various systems and devices, such as the media items scheduling and packaging system 102, the plurality of published data sources 110A, . . . , 110N, the plurality of advertisement generation systems 112A, . . . , 112N, the plurality of consumer devices 114A, . . . , 114N, the distribution source device 118, the audience data source 120, and the social media server 122. For example, the network 116 may comprise one or more of a cable television network, the Internet, a satellite communication network, a wide area network (WAN), a medium area network (MAN), and a local area network (LAN).

The distribution source device 118 may comprise suitable logic, circuitry, and interfaces that may be configured to communicate programming media content, such as a video feed, and a schedule of a channel, such as an existing channel, to the media items scheduling and packaging system 102. In accordance with an embodiment, the programming media content of the channel may correspond to a broadcast feed. The distribution source device 118 may be communicatively coupled to the network 116.

The audience data source 120 may comprise suitable logic, circuitry, and interfaces that may be configured to execute code that handles retrieval and storage of audience data that corresponds to subscribers of the plurality of consumer devices 114A, . . . , 114N. The audience data may include demographics data, audience targeting data, device type data, device platform data, and content recognition-based data, such as automatic content recognition (ACR)-based data. The audience data source 120 may further include user estimation data. The user estimation data may include calculated values derived by processing of audience data, which corresponds to subscribers of the plurality of consumer devices 114A, . . . , 114N, received from the audience data source 120. The user estimation data may also include a path to retrieve a media item, for example, a trending media item, from the social media server 122 or other content servers. The user estimation data may be interchangeably referred to as audience estimation information or audience forecast information.

The audience data source 120 may be configured to generate audience forecast information (as user estimation data) and estimate audience for at least one of a target or demographics for non-programming media items that is to be scheduled. The audience forecast input information may include historical audience ratings, historical lead-in rating, and/or other research-based forecast. The audience data source 120 may also generate an expected audience of a promotional schedule for each non-programming media item that is planned for the specified upcoming time-frame. In accordance with an embodiment, the audience data source 120 may acquire historical data for the plurality of non-programming media items to be scheduled for the specified upcoming time-frame. The audience data source 120 may generate a plurality of values associated with an impact measure for each of the plurality of non-programming media items based on the acquired historical data.

The social media server 122 may comprise suitable logic, circuitry, and interfaces that may be configured to execute code through which users generate trending data. The trending data may comprise information of what is trending in the social networks (or platforms), such as Twitter®, Facebook®, and the like. The trending data may also comprise information indicative of what is trending based on social engagement, such as number of likes or votes to a particular media item, or number of people watching a particular media item. In an exemplary embodiment, the trending data may indicate an aggregate interest level of a number of users in the social networks for a particular media item. For example, a thousand or more shares, or likes by a number of users may indicate a highly popular media item.

In operation, the scheduling system 104 in the media items scheduling and packaging system 102 may be configured to receive programming media content, such as a live video feed of a channel, from the distribution source device 118, via the network 116. In some embodiments, based on an on-demand request received from a computing device, the scheduling system 104 may be configured to retrieve the programming media content, such as pre-stored VOD assets of a channel, from the data storage system 108, via the network 116. Generally, the term "content," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like.

In accordance with an embodiment, the scheduling system 104 may be further configured to receive program-specific information, such as closed captions, associated with the programming media content from the distribution source device 118, via the network 116. In accordance with another embodiment, the scheduling system 104 may be configured to determine the program-specific information based on parsing the programming media content of the channel by use of various parsing techniques, known in the art.

The scheduling system 104 may be further configured to extract contextual data from the program-specific information associated with the programming media content of the channel based on a plurality of natural language processing techniques. In accordance with an embodiment, the extraction of the contextual data may be based on content recognition of the programming media content of the channel. The contextual data may correspond to a plurality of topics that correspond to one or more time intervals of the programming media content of the channel. In accordance with an embodiment, the scheduling system 104 may be configured to map the extracted contextual data in the programming media content based on a thesaurus database in the data storage system 108. Alternatively stated, the scheduling system 104 may be configured to extract keywords from the contextually relevant data of the programming media content based on mapping of the contextually relevant data with the keywords or event information in the thesaurus database.

The scheduling system 104 may be further configured to retrieve a plurality of non-programming media items, such as advertisement content, promotional content, or creatives, from advertisement content library of an advertiser, such as the advertisement generation system 112A, via the network 116. The advertisement content library stores the plurality of non-programming media items and corresponding media item metadata, such as closed captions. Each of the plurality of non-programming media items may be associated with at least one of a programming media content source (such as an advertiser), media item information (such as creative information), a plurality of users (such as a target audience), and duration of the media item.

The scheduling system 104 may be further configured to determine sentiment types of the plurality of non-programming media items based on a match between the media item metadata associated with each of the plurality of non-programming media items and a vocabulary database, such as a mood vocabulary, in the data storage system 108. The scheduling system 104 may be further configured to determine the plurality of potential non-programming media items based on a match between the extracted contextual data and a sentiment type of each of the plurality of non-programming media items. The determined plurality of non-programming media items may be the potential non-programming media items that may be dynamically scheduled in the programming media content to be delivered to the plurality of consumer devices 114A, . . . , 114N.

The scheduling system 104 may be further configured to determine a plurality of candidate spots in the programming media content based on at least the extracted contextual data and the sentiment type of each of the determined plurality of non-programming media items. Accordingly, the scheduling system 104 may be configured to dynamically generate a schedule of at least one non-programming media item from the determined plurality of non-programming media items for at least one candidate spot from the determined plurality of candidate spots in the programming media content. The at least one non-programming media item may be dynamically scheduled based on at least a set of constraints and user estimation data. The set of constraints may comprise at least one of a count of non-programming media items to be inserted for a defined time duration of the programming media content, a minimum or maximum count of non-programming media items that correspond to a programming media content source, programming media content identifier to differentiate between similar product items corresponding to different brands, break duration limits, or time separation. The dynamic schedule of the at least one non-programming media item at the at least one candidate spot may be further based on social media data associated with social media behavior of a plurality of users associated with the plurality of consumer devices. The scheduling system 104 may be configured to receive the user estimation data from the audience data source 120, via the network 116. The user estimation data may include viewer data, demographics data, audience targeting data, device type data, device platform data, automatic content recognition (ACR)-based data, historical audience ratings, historical lead-in ratings, and/or other research-based forecast. The scheduling system 104 may be further configured to receive the social media data from the social media server 122, via the network 116. The social media data received from the social media server 122 may include trending data that includes a list of non-programming media items currently trending in one or more social network platforms, information of what is trending based on social engagement, such as number of likes or votes to a particular media item, or number of people watching a particular media item. The trending information may indicate an aggregate interest level of a number of users in the social networks for the one or more non-programming media items.

Based on the dynamically generated schedule, the PEMCC 106 may be configured to insert the at least one non-programming media item from the determined plurality of non-programming media items at the at least one candidate spot from the determined plurality of candidate spots within the programming media content to generate a program stream. The generated program stream may be distributed (e.g. multicast) to the plurality of consumer devices 114A, . . . , 114N, via the network 116.

The scheduling system 104 may be further configured to determine an engagement index of the plurality of users associated with the plurality of consumer devices 114A, . . . , 114N for the distributed program stream. The program stream comprises the programming media content with inserted (for example stitched-in) plurality of non-programming media items at the plurality of candidate spots based on the dynamically generated schedule. The determined engagement index for the plurality of users may be objectively quantified to emphasize on metrics or statistics associated audience retention and impact translation for different topics associated with the programming media content. The determined engagement index may be optimized to reflect on an increased return of investment (ROI)

for the non-programming media items, such as the advertisements, displayed based on the generated dynamic schedule.

Thus, the scheduling system 104, in an optimized way, may be configured to dynamically schedule the determined the plurality of non-programming media items in the programming media content of the channel to be delivered over the network 116 to be viewed on one or more of the plurality of consumer devices 114A, . . . , 114N. The dynamic schedule is the most optimal schedule as the plurality of non-programming media items is most relevant and impactful for a target audience as the sentiment types of the plurality of non-programming media items are in sync with the contextual data of the programming media content. An example of the dynamically scheduling non-programming media items in programming media content is shown and described in FIGS. 3A and 3B.

Figure 2:
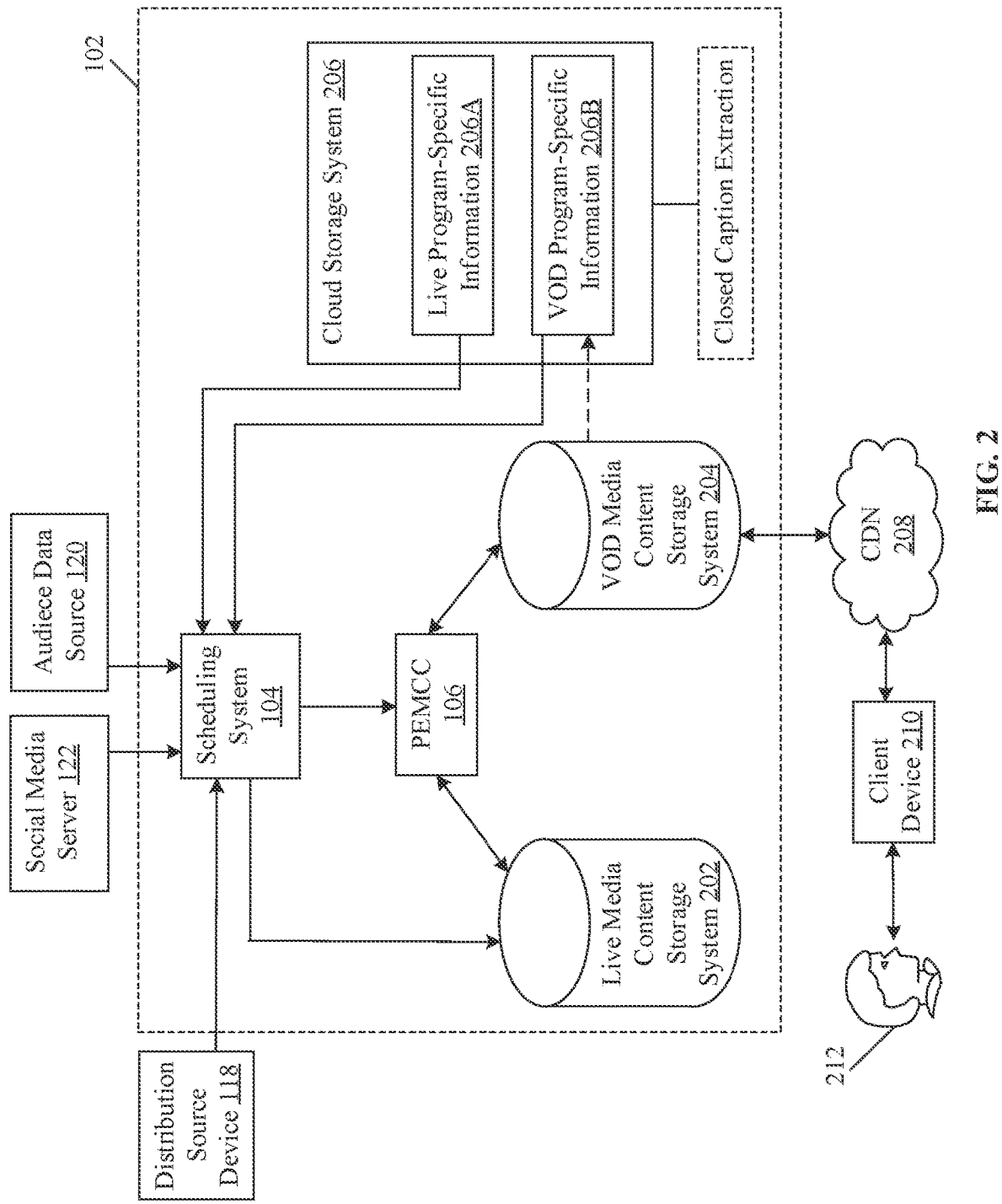
FIG. 2 is a block diagram that illustrates an exemplary media items scheduling and packaging system for dynamically scheduling non-programming media items in programming media content, in accordance with an exemplary embodiment of the disclosure.

FIG. 2 is a block diagram that illustrates an exemplary media items scheduling and packaging system for dynamically scheduling non-programming media items in programming media content, in accordance with an exemplary embodiment of the disclosure. Referring to FIG. 2, the media items scheduling and packaging system 102 may further comprise a live media content storage system 202, a VOD media content storage system 204, and a cloud storage system 206. The cloud storage system 206 may include live program-specific information 206A and VOD program-specific information 206B. The live media content storage system 202, the VOD media content storage system 204, and the cloud storage system 206 may be provided in the data storage system 108, as described in FIG. 1. There is further shown the scheduling system 104, the PEMCC 106, and the distribution source device 118 provided in the media items scheduling and packaging system 102, as described in FIG. 1. There is also shown a CDN 208, which is an example of the network 116, a client device 210, which is one of the plurality of consumer devices 114A, . . . , 114N, and a user 212 associated with the client device 210.

In some embodiments of the disclosure, the scheduling system 104 and the PEMCC 106 may be integrated to form an integrated system. In some embodiments of the disclosure, as shown, the scheduling system 104 and the PEMCC 106 may be distinct. Other separation and/or combination of the various entities of the exemplary media items scheduling and packaging system 102 illustrated in FIG. 2 may be done without departing from the spirit and scope of the various embodiments of the disclosure.

The live media content storage system 202 may comprise suitable logic, circuitry, and interfaces that may be configured to store live media content segments of one or more live feeds of channels, such as a live broadcast feed of a certain channel (e.g. a TBS channel). The live media content storage system 202 may correspond to a storage system for a linear programming media content. Such live feed may be distributed in real-time on the channel to be viewed on the plurality of computing devices 114A, . . . , 114N. The live media content storage system 202 may be communicatively coupled to the CDN 208 to receive the one or more live feeds of channels.

The VOD media content storage system 204 may comprise suitable logic, circuitry, and interfaces that may be configured to store one or more pre-encoded VOD media content segments of non-real time programming data, for example, movies, music videos, clips of various shows or programs, and/or the like. Such VOD media content segments may be included in the channel to be viewed on the plurality of computing devices 114A, . . . , 114N based on a demand by the broadcast provider or users. The VOD media content storage system 204 may be communicatively coupled to the CDN 208. The VOD media content storage system 204 may include pre-encoded VOD assets.

The cloud storage system 206 may comprise suitable logic, circuitry, and interfaces that may be configured to store pre-specified information (or metadata) of the programming media content and/or non-programming media items. In accordance with an embodiment, the cloud storage system 206 may store the metadata that include rules related to the programming media content and/or non-programming media items. For example, the metadata may specify whether or not the programming media content and/or non-programming media items can be archived, and if so when and where can it be archived. The metadata may also specify whether or not the programming media content and/or non-programming media items can be blocked out, and if so where and what portions may be blocked out. The metadata may further include the one or more inbound triggers of the programming media content and/or non-programming media items. The metadata may further include one or more attributes of the programming media content and/or non-programming media items, such as start time and end time of one or more portions of the programming media content and/or non-programming media items. The cloud storage system 206 may comprise VOD program-specific information 206B and live program-specific information 206A.

The live program-specific information 206A may include metadata associated with live media content segments of one or more live feeds of channels stored in the live media content storage system 202. The live program-specific information 206A may store program-specific information data as defined by ISO/IEC13818-1 (MPEG-2), closed captioning data, and one or more inbound triggers of the live media content associated with the live content segments stored in the live media content storage system 202. The live program-specific information 206A may store other information, such as a programming media content identifier, a title of the programming media content, a short summary of the content segments, a file format, encryption information, length of the programming media content, a date and/or time the programming media content was added to the catalog of programming media content, a new item indicator for the programming media content, a programming media content class, for example, a television show, a cartoon program, a movie, a news media, an episode, a game, a clip, a recorded sports event, interactive media, and/or the like.

The VOD program-specific information 206B may include metadata associated with VOD media content segments stored in the VOD media content storage system 204. The VOD program-specific information 206B may store program-specific information data as defined by ISO/IEC 13818-1 (MPEG-2) and closed captioning data associated with the live content segments stored in the VOD media content storage system 204. The VOD program-specific information 206B may further include other information, such as a VOD media content identifier, a title of the VOD media content, a short summary of the VOD content segments, a file format, encryption information, length of the programming media content, a date and/or time the programming media content was added to the catalog of programming media content, a new content indicator for the programming media content (e.g., a new VOD asset that became available within the last 24 hours, last few days, last week, and/or the like), a programming media content class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies.

The CDN 208 may correspond to the network 116. The CDN 208 may comprise networks configured for distributing programming media content. The CDN 10 may be configured for distributing programming media content to the plurality of consumer devices 114A, . . . , 114N, such as the client device 210. The distribution may be done, for example, via broadcast or multicast, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client device 210 may be one of the plurality of consumer devices 114A, . . . , 114N. In accordance with an embodiment, the client device 210 may be an ACR-enabled device. The client device 210 may be configured to communicate with the media items scheduling and packaging system 102, via the CDN 208, or a separate communication network. The functions and/or operations performed by the media items scheduling and packaging system 102, and its various components, are further described, in FIGS. 3A, 3B, 4A, and 4B.

Figure 3A:
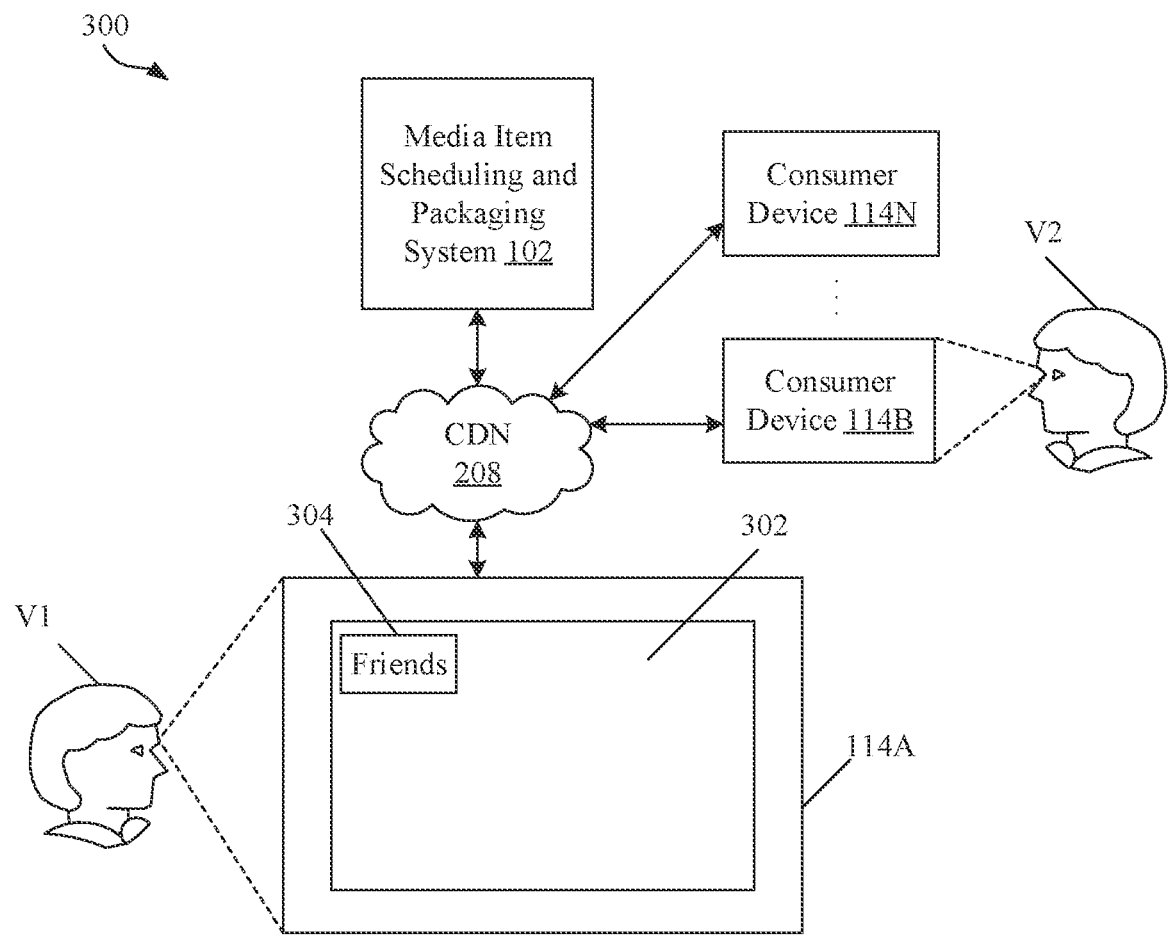
FIGS. 3A and 3B, collectively, illustrate an exemplary scenario for dynamically scheduling non-programming media items in programming media content, in accordance with an exemplary embodiment of the disclosure.
Figure 3B:
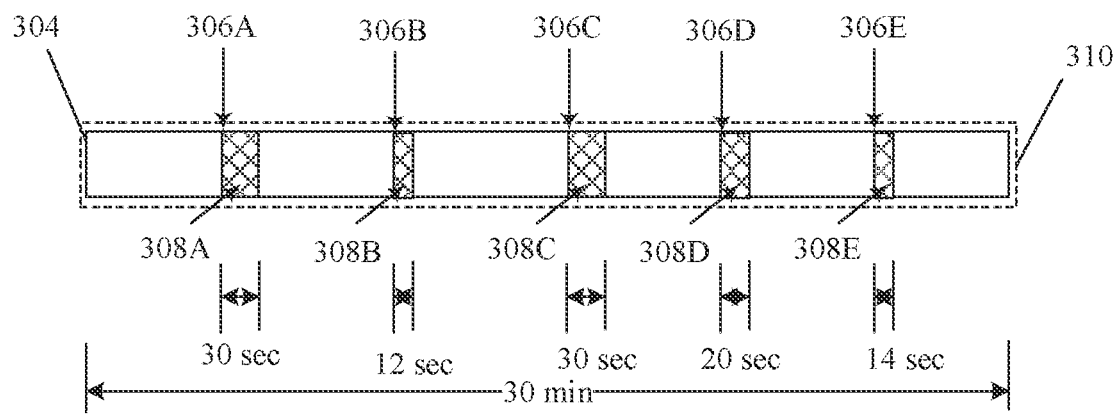

FIGS. 3A and 3B, collectively, illustrate an exemplary scenario for dynamically scheduling non-programming media items in programming media content by the media items scheduling and packaging system 102 of FIGS. 1 and 2, in accordance with an exemplary embodiment of the disclosure. Referring to FIG. 3A, there is shown an exemplary illustrative scenario 300 that includes the media items scheduling and packaging system 102, two consumer devices 114A and 114B, and the CDN 208. There is also shown a program channel 302 provided by the distribution source device 118. The program channel 302 facilitates playback of a programming media content 304, such as TV show "Friends", that is multicast to the consumer devices 114A and 114B. Viewers V1 and V2 may be associated with the consumer devices 114A and 114B, respectively. Referring to FIG. 3B, there is shown the programming media content 304 of a specific duration, for example "30 min". There are further shown five candidate spots 306A, . . . , 306E and five advertisement content items 308A, . . . , 308E of variable durations (as described below) inserted in the programming media content 304 based on a dynamically generated schedule to generate a program stream 310.

With reference to FIG. 3A, the programming media content 304 may be associated with in-stream closed captions. The media items scheduling and packaging system 102 may extract the in-stream metadata from the programming media content 304 and store as the live program-specific information 206A in the cloud storage system 206. The media items scheduling and packaging system 102 may extract contextual data, i.e. topics, from the programming media content 304 based on one or more natural language techniques, known in the art. The mapping of the extracted topics may be executed based on the thesaurus database in the data storage system 108. For example, the media items scheduling and packaging system 102, by use of a natural language processing technique, may determine that at a specific timestamp, for example "11th min", the topic in the programming media content 304 is "birth".

Based on the extracted topics, the media items scheduling and packaging system 102 may identify advertisers for selection of advertisement content and brands for a target audience, such as the viewers V1 and V2. For example, the media items scheduling and packaging system 102 may identify advertiser "Gerber" related to baby products, baby accessories, baby clothing, car accessories for babies, and the like.

The media items scheduling and packaging system 102 further retrieves multiple potential advertisement content items 308A, . . . , 308G and associated closed captions from an advertisement content library associated with an advertiser, for example the advertisement generation system 112A "Gerber", via the network 116. The retrieval of the various potential advertisement content items 308A, . . . , 308G are based on the identified advertiser. For example, the scheduling system 104 retrieves various advertisement content items "Gerber cereal", "Gerber children wear", "Gerber Life Insurance", "Gerber Infant Gear", and "Gerber baby seats" from the advertisement content library of the advertisement generation system 112A "Gerber".

The media items scheduling and packaging system 102 may be further configured to determine sentiment types of the potential advertisement content items 308A, . . . , 308G based on natural language processing (NLP) of the program-specific information, such as closed captions (CC) data, associated with the potential advertisement content items 308A, . . . , 308G. In other words, the program-specific information (CC data) associated with the potential advertisement content items 308A, . . . , 308G may be semantically and/or syntactically parsed (language parsing) by the media items scheduling and packaging system 102 to further determined the sentiment types of the potential advertisement content items 308A, . . . , 308G. In accordance with an embodiment, the sentiment types of the potential advertisement content items 308A, . . . , 308G may be determined based on a match between the associated closed captions with a mood vocabulary in the data storage system 108. In accordance with an embodiment, the media items scheduling and packaging system 102 determines sentiment types of the potential advertisement content items 308A, . . . , 308G based on a pattern of face recognition, for example happy expression or sad expression, of one or more characters in video stream of the various potential advertisement content items 308A, . . . , 308G.

Further, the media items scheduling and packaging system 102 may determine candidate spots 306A, . . . , 306E in the programming media content 304. The candidate spots 306A, . . . , 306E may be determined based on the determined topics at specific timestamps and the sentiment types of the potential advertisement content items 308A, . . . , 308G. For such candidate spots 306A, . . . , 306E, the media items scheduling and packaging system 102 may dynamically generate a schedule of one or more of the potential advertisement content items 308A, . . . , 308G, based on a set of constraints, user estimation data, and social media data. For example, the scheduling system 104 determines that the conflict codes of two advertisement content items 308F and 308G are same. Further, the advertisement content item 306G corresponds to an advertisement generation system 112A with which the other advertisement content item 306D already corresponds. Moreover, the length of the advertisement content item 306G is "50 sec" as against the permissible duration of "30 sec" at each candidate spot. Further, the media items scheduling and packaging system 102 receives the social media data from the social media server 122, via the network 116, to determine whether engagement metrics, such as likes or dislikes for the associated advertisement content item 306F, are substantially high. Furthermore, the media items scheduling and packaging system 102 receives user estimation data from the audience data source 120, via the network 116, to determine that only two users, associated with the consumer devices 114A and 114B, are targeted audience, to whom one or more of the potential advertisement content items 308A, . . . , 308G should be delivered to. Further, the programming media content 304 may comprise multiple spots for insertion of a maximum of "2 min 30 sec" commercial break time. Furthermore, a specific number of advertisement content, for example a maximum of "5", with specific durations, for example a maximum of "30 sec", with specific time separations, for example a maximum of "12 min", may be permissible in the programming media content 304. Further, such advertisement content items should be trending and targeted for the viewers V1 and V2. It may be note that the aforesaid instances are cited merely for exemplary purposes and should not be construed to limit the scope of the disclosure.

Accordingly, out of the available advertisement content items 308A, . . . , 308G, the media items scheduling and packaging system 102 may determine the advertisement content items 308A, . . . , 308E to be the potential advertisement content items. Consequently, the media items scheduling and packaging system 102 may dynamically generate a schedule for the potential advertisement content items 308A, . . . , 308E in the programming media content 304 in the most optimized manner at the candidate spots 306A, . . . , 306E in the programming media content 304. Based on the dynamically generated schedule, the PEMCC 106 inserts the advertisement content items 308A, . . . , 308E at the candidate spots 306A, . . . , 306E within the programming media content 304 to generate a program stream 310. The generated program stream 310 is distributed to the two consumer devices 114A and 114B of the plurality of consumer devices 114A, . . . , 114N, via the network 116.

The scheduling system 104 may be further configured to determine an engagement index of the two viewers V1 and V2 associated with the consumer devices 114A and 114B, respectively, for the distributed program stream 310. Such determined engagement index for the two viewers V1 and V2 may be objectively quantified to emphasize on metrics and/or statistics associated audience retention and impact translation for different topics associated with the programming media content. The determined engagement index may be optimized to reflect on an increased return of investment (ROI) for the non-programming media items, such as the advertisements, displayed based on the generated dynamic schedule. The determined engagement index may be factored based on a match of the sentiments of the advertisement content items 308A, . . . , 308E with the topics of the programming media content 304, specifically targeted to the viewers V1 and V2 associated with the consumer devices 114A and 114B. Such a framework provides various improvements, such as, for example, more impactful targeted advertising, improved ROI for the advertisement generation system 112A, better user retention for the channel, improved revenues for the broadcasting source, and enhanced user engagement of the viewers V1 and V2.

Figure 4A:
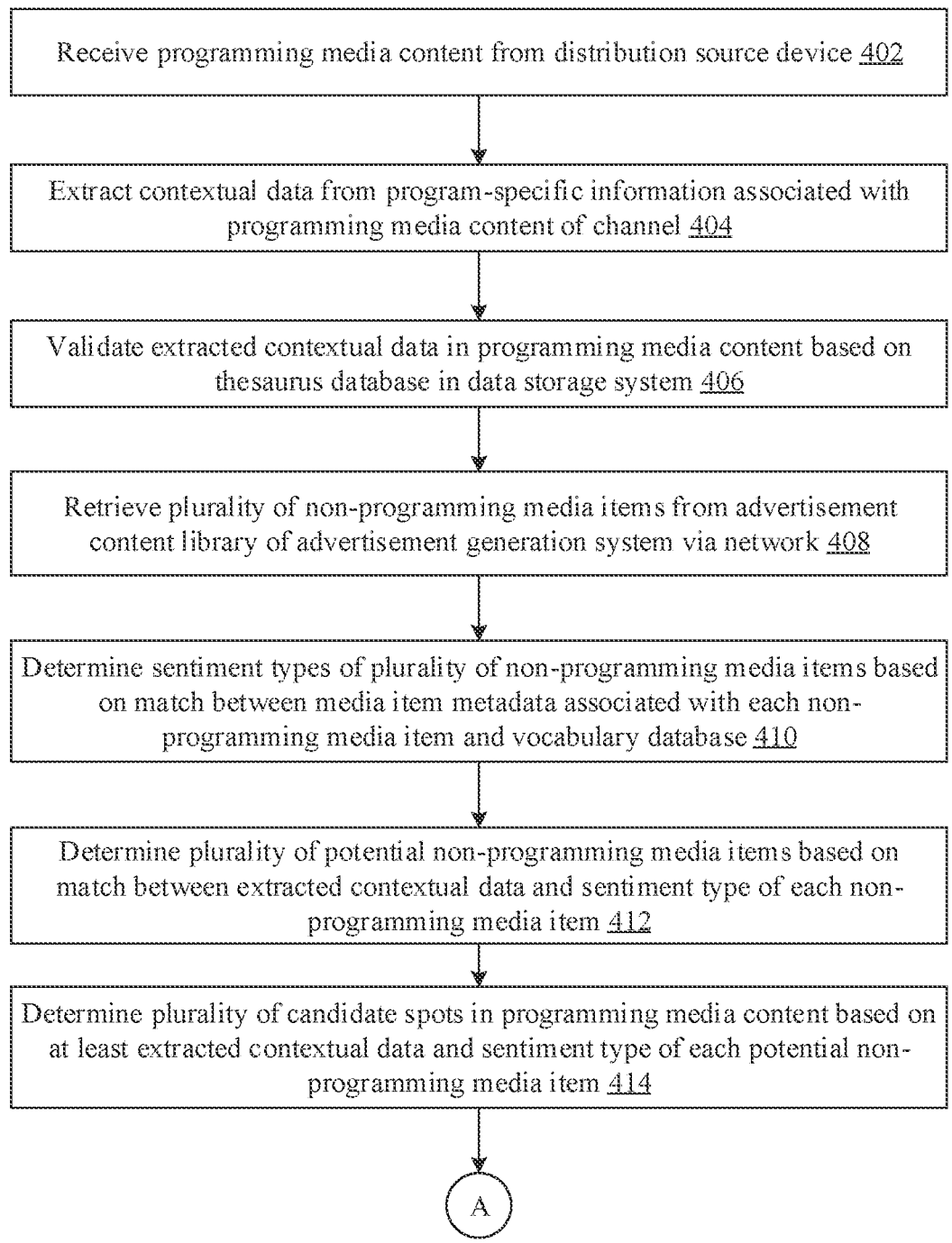
FIGS. 4A and 4B, collectively, depict a flow chart illustrating exemplary operations for dynamically scheduling non-programming media items in programming media content in the media items scheduling and packaging system of FIG. 2, in accordance with an exemplary embodiment of the disclosure.
Figure 4B:
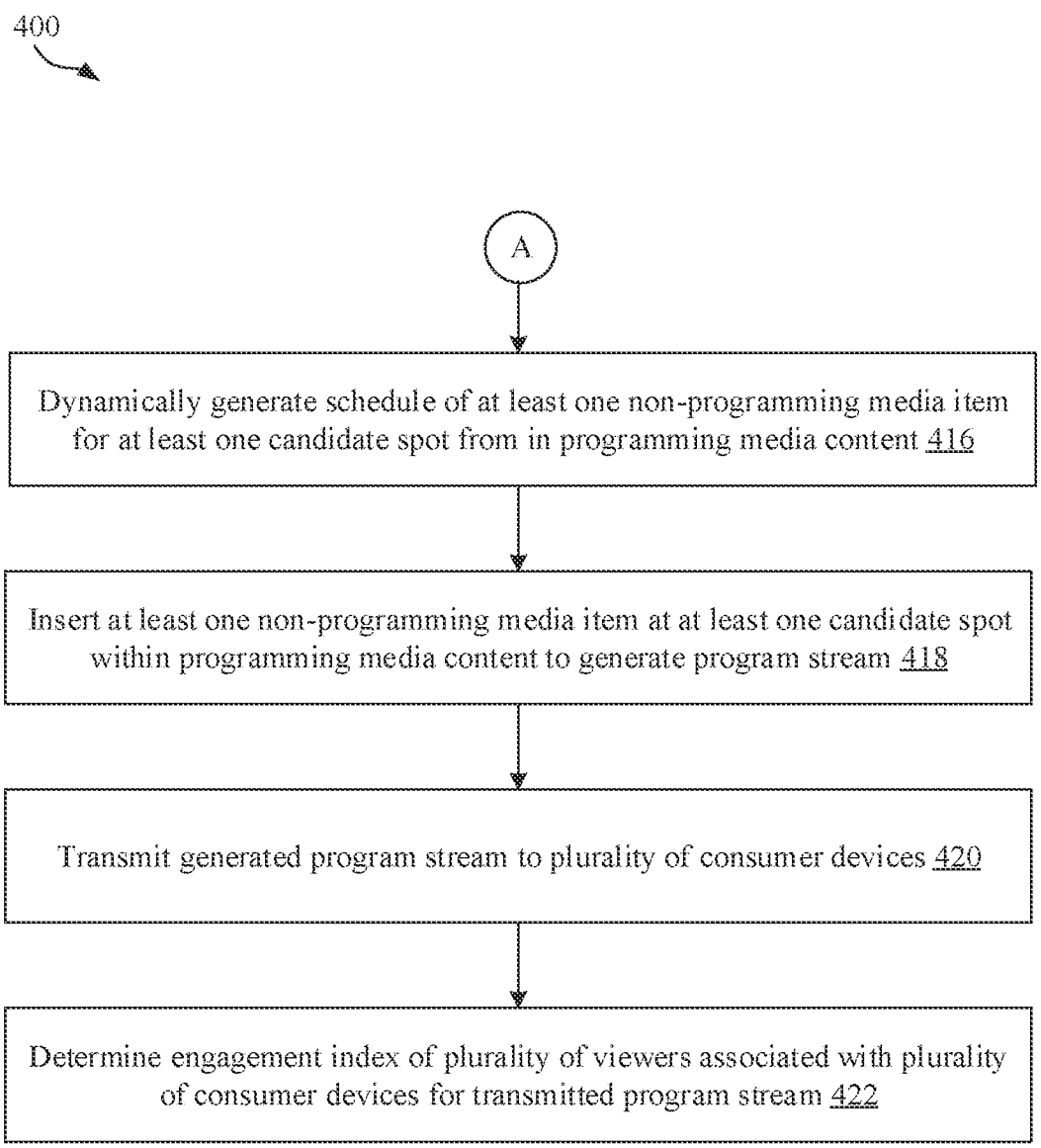

FIGS. 4A and 4B, collectively, depict a flow chart illustrating exemplary operations for dynamically scheduling non-programming media items in programming media content in the media items scheduling and packaging system 102 of FIGS. 1 and 2, in accordance with an exemplary embodiment of the disclosure. Referring to FIGS. 4A and 4B, there is shown a flow chart 400 comprising exemplary operations 402 through 422.

At 402, a programming media content of a channel may be received. In accordance with an embodiment, the scheduling system 104 in the media items scheduling and packaging system 102 may be configured to receive the programming media content from the distribution source device 118, via the network 116. For example, with reference to FIG. 3A, the scheduling system 104 receives the live video feed of the programming media content 304, such as TV show "Friends", on the program channel 302, such as a TBS channel. In accordance with another embodiment, the scheduling system 104 in the media items scheduling and packaging system 102 may be configured to receive the programming media content from the live media content storage system 202 or the VOD media content storage system 204.

In accordance with an embodiment, the scheduling system 104 may be further configured to receive program-specific information, such as closed captions, associated with the programming media content from the distribution source device 118, via the network 116. In accordance with another embodiment, the scheduling system 104 may be configured to determine the program-specific information based on parsing the programming media content of the channel by use of various parsing techniques, known in the art. In accordance with another embodiment, the scheduling system 104 may be configured to receive the program-specific information from the live program-specific information 206A or the VOD program-specific information 206B. For example, the scheduling system 104 determines that at a specific timestamp, for example "11th min", the topic in the programming media content 304 is "birth".

At 404, contextual data may be extracted from the program-specific information associated with the programming media content of the channel. In accordance with an embodiment, the scheduling system 104 may be configured to extract contextual data from the program-specific information associated with the programming media content of the channel based on various techniques, for example a plurality of natural language processing techniques. For example, the scheduling system 104, by use of a natural language processing technique, determines that within first "12 min" of duration of the programming media content 304, the keywords, excluding the stop words (for example "is", "am", "I", and the like), may be "baby", "celebration", and "hospital". Such keywords may correspond to the extracted contextual data.

At 406, the extracted contextual data in the programming media content may be mapped based on a thesaurus database in the data storage system 108. In accordance with an embodiment, the scheduling system 104 may be configured to map the extracted contextual data in the programming media content based on a thesaurus database in the data storage system 108. In other words, the scheduling system 104 may be configured to extract keywords from the contextually relevant data of the programming media content based on mapping of the contextually relevant data with the keywords or event information in the thesaurus database. For example, the scheduling system 104, by use of a natural language processing technique, may determine that at a specific timestamp, for example "11th min", the topic in the programming media content 304 is "birth". Based on the extracted topics, the scheduling system 104 may identify advertisers for selection of advertisement content and brands for a target audience, such as the viewers V1 and V2. For example, the scheduling system 104 identifies an advertiser "Gerber" related to baby products, baby accessories, baby clothing, car accessories for babies, and the like.

At 408, a plurality of non-programming media items, such as advertisement content, promotional content, or creative, may be retrieved. In accordance with an embodiment, the scheduling system 104 may be configured to retrieve the plurality of non-programming media items from advertisement content library of an advertiser, such as the advertisement generation system 112A, via the network 116. The advertisement content library stores the plurality of non-programming media items, corresponding media item metadata (such as closed captions), a programming media content source (such as an advertiser), media item information (such as creative information), a plurality of users (such as a target audience), and duration of the media item. For example, the scheduling system 104 retrieves various advertisement content items "Gerber cereal", "Gerber children wear", "Gerber Life Insurance", "Gerber Infant Gear", and "Gerber baby seats" from the advertisement content library of the advertiser "Gerber".

At 410, sentiment types of the plurality of non-programming media items may be determined. In accordance with an embodiment, the scheduling system 104 may be configured to determine the sentiment types of the plurality of non-programming media items based on a match between the media item metadata associated with each of the plurality of non-programming media items and a vocabulary database, such as a mood vocabulary, in the data storage system 108. In accordance with an embodiment, the scheduling system 104 determines sentiment types of the potential advertisement content items based on a pattern of face recognition, for example happy expression or sad expression, of one or more characters in video stream of the various potential advertisement content items. For example, the scheduling system 104 may determine the sentiment type "happy" of the plurality of non-programming media items based on a pattern of facial expressions of various characters in the video of the advertisement content items "Gerber cereal", "Gerber children wear", "Gerber Infant Gear", and "Gerber baby seats". In accordance with an embodiment, the sentiment types of the potential advertisement content items may be determined based on natural language processing (NLP) of the program-specific information, such as closed captions (CC) data or other textual information, associated with the potential advertisement content items. In other words, the program-specific information (CC data) associated with the potential advertisement content items may be semantically and/or syntactically parsed (language parsing) by the media items scheduling and packaging system 102 to further determined the sentiment types of the potential advertisement content items.

At 412, a plurality of potential non-programming media items from the plurality of non-programming media items may be determined. In accordance with an embodiment, the scheduling system 104 may be configured to determine the plurality of potential non-programming media items. The plurality of potential non-programming media items may be determined based on a match among the extracted contextual data, a sentiment type and a creative of each of the plurality of non-programming media items. For example, the scheduling system 104 may determine the advertisement content items "Gerber cereal", "Gerber children wear", "Gerber Infant Gear", and "Gerber baby seats" as potential non-programming media items.

At 414, a plurality of candidate spots in the programming media content may be determined. In accordance with an embodiment, the scheduling system 104 may be configured to determine a plurality of candidate spots in the programming media content based on at least the extracted contextual data and the sentiment type of each of the determined plurality of potential non-programming media items. For example, the scheduling system 104 determines a candidate spot at timestamp "11 min" in the programming media content 304 based on at least the extracted contextual data, i.e. "birth", and the sentiment type, i.e. "happy", of each of the determined plurality of potential non-programming media items, i.e. "Gerber cereal", "Gerber children wear", "Gerber Infant Gear", and "Gerber baby seats".

At 416, a schedule of at least one non-programming media item from the determined plurality of potential non-programming media items may be dynamically generated for at least one candidate spot from the determined plurality of candidate spots in the programming media content. In accordance with an embodiment, the scheduling system 104 may be configured to dynamically generate a schedule of at least one non-programming media item from the determined plurality of potential non-programming media items for at least one candidate spot from the determined plurality of candidate spots in the programming media content. The at least one non-programming media item may be dynamically scheduled based on, for example, at least a set of constraints and user estimation data. The dynamic schedule of the at least one non-programming media item for at the at least one candidate spot may be further based on social media data associated with social media behavior of a plurality of users associated with the plurality of consumer devices.

In an exemplary embodiment, the scheduling system 104 dynamically generates a schedule of the non-programming media items "Gerber cereal" and "Gerber Infant Gear" from the determined plurality of potential non-programming media items for the candidate spot at timestamp "11 min" in the programming media content 304. The dynamically generated schedule of the non-programming media items "Gerber cereal" and "Gerber Infant Gear" is based on various constraints, such as duration is "13 sec" and "17 sec", respectively, for a given permissible duration of "30 sec" for the candidate spot. The "Gerber cereal" and "Gerber Infant Gear" are trending products as per the social media data received from the social media server 122. Further, the viewers V1 and V2 are the estimated audience based on corresponding user profiles.

At 418, the at least one non-programming media item from the determined plurality of potential non-programming media items may be inserted at the at least one candidate spot from the determined plurality of candidate spots within the programming media content. In accordance with an embodiment, the PEMCC 106 may be configured to insert the at least one non-programming media item at the at least one candidate spot within the programming media content to generate a program stream, such as the program stream 310. The generated program stream may represent a version of a combination of programming media content and non-programming media items that corresponds a specific set of consumer devices that find the inserted non-programming media items to be most relevant, impactful, and seamless. For example, the PEMCC 106 executes video stitching of the non-programming media items "Gerber cereal" and "Gerber Infant Gear" within the programming media content 304 at the candidate spot 306A to generate the program stream which corresponds to a customized video feed for the viewers V1 and V2.

The PEMCC 106 may be configured to execute video stitching of the determined plurality of potential non-programming media items within the programming media content to generate the program stream which corresponds to a customized video feed. For example, the insertion (e.g.

video stitching) may include replacement of a segment of the plurality of segments with the determined programming media content. In another example, the video stitching may include insertion or addition of the determined non-programming media item among the plurality of segments of the programming media content. In yet another example, the video stitching may further include a re-ordering of the plurality of segments of the programming media content along with the insertion of the determined programming media content.

At 420, the generated program stream may be distributed (e.g. multicast). In accordance with an embodiment, the scheduling system 104 in conjunction with the PEMCC 106, may be configured to distribute the generated program stream, for example the program stream 310, on the channel to be viewed at a set of computing devices of the plurality of consumer devices 114A, . . . , 114N, via one or more communication mediums, such as the network 116. In accordance with an embodiment, a generated program stream to be viewed on the set of user-computing devices may correspond to a set of users that may be referred to as a target audience. In such scenario, a set of users may view streaming of the generated program stream, which comprises non-programming media items that are most relevant to the set of users. For example, the scheduling system 104 in conjunction with the PEMCC 106 distributes the generated program stream on the program channel 302 to be viewed at the computing devices 114A and 114B, via the CDN 208.

At 422, an engagement index of the plurality of users associated with the plurality of consumer devices 114A, . . . , 114N may be determined. In accordance with an embodiment, the scheduling system 104 may be configured to determine the engagement index of the plurality of users associated with the plurality of consumer devices 114A, . . . , 114N for the distributed program stream. Such engagement index of the plurality of users may be objectively quantified to emphasize on metrics and/or statistics associated audience retention and impact translation for different topics associated with the programming media content. The determined engagement index may be optimized to reflect on an increased return of investment (ROI) for the non-programming media items, such as the advertisements, displayed based on the generated dynamic schedule.

Figure 5:
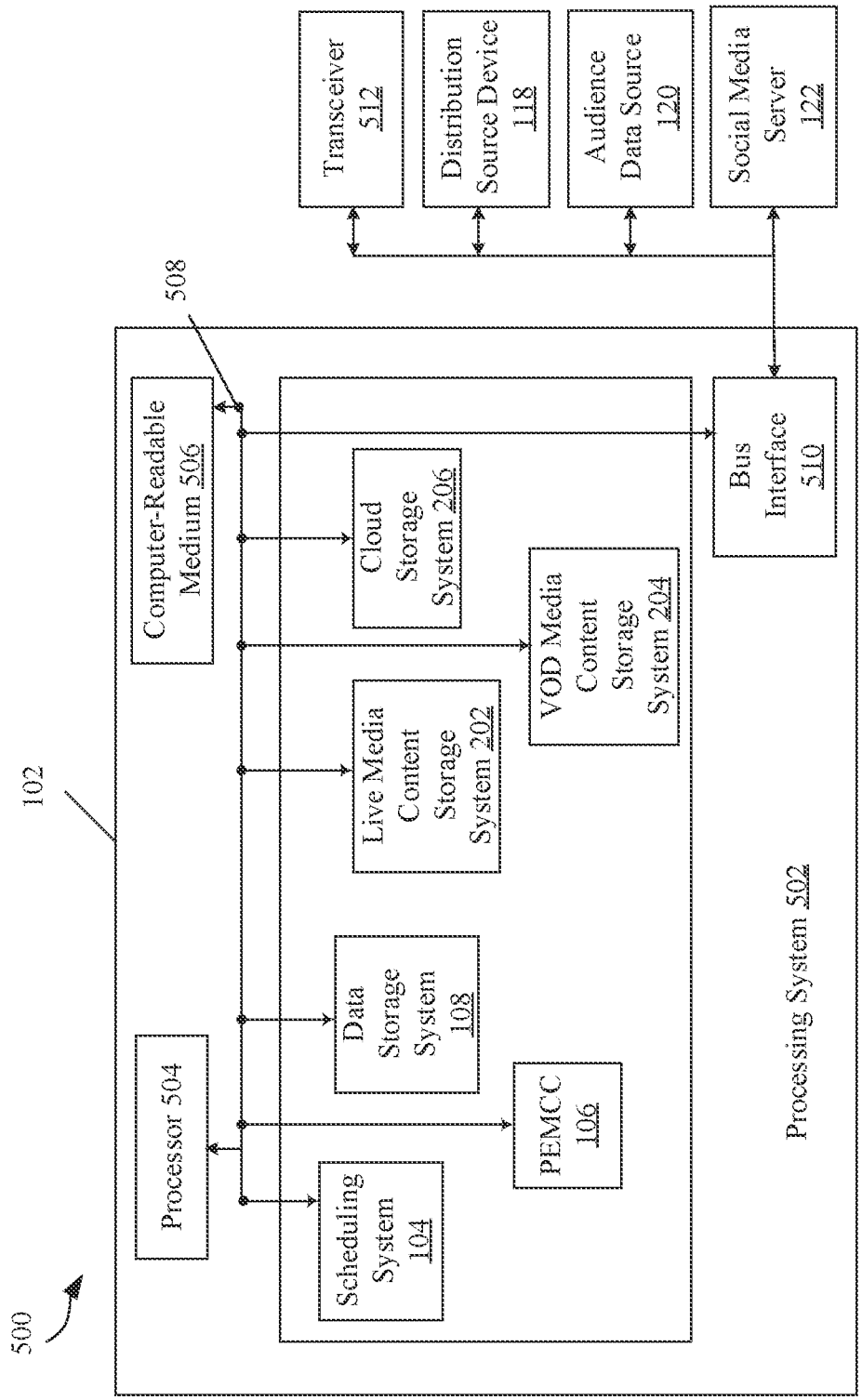
FIG. 5 is a conceptual diagram illustrating an example of a hardware implementation for media items scheduling and packaging system employing a processing system for dynamically scheduling non-programming media items in programming media content, in accordance with an exemplary embodiment of the disclosure.

FIG. 5 is a conceptual diagram illustrating an example of a hardware implementation for a media items scheduling and packaging system employing a processing system for dynamically scheduling media items in programming media content, in accordance with an exemplary embodiment of the disclosure. Referring to FIG. 5, the hardware implementation shown by a representation 500 for the media items scheduling and packaging system 102 employs a processing system 502 for dynamically scheduling non-programming media items in programming media content, in accordance with an exemplary embodiment of the disclosure, as described herein. In some examples, the processing system 502 may comprise one or more hardware processors 504, a non-transitory computer-readable medium 506, a hardware scheduling system 104, a hardware PEMCC 106, a hardware data storage system 108, the hardware live media content storage system 202, the hardware VOD media content storage system 204, and the hardware cloud storage system 206. In accordance with an embodiment, the data storage system 108 may include the hardware live media content storage system 202, the hardware VOD media content storage system 204, and the hardware cloud storage system 206.

In this example, the media items scheduling and packaging system 102 employing the processing system 502 may be implemented with bus architecture, represented generally by bus 508. The bus 508 may include any number of interconnecting buses and bridges depending on the specific implementation of the media items scheduling and packaging system 102 and the overall design constraints. The bus 508 links together various circuits including the one or more processors, represented generally by the hardware processor 504, the non-transitory computer-readable media, represented generally by the computer-readable medium 506, the hardware scheduling system 104, the hardware PEMCC 106, the hardware data storage system 108, the hardware live media content storage system 202, the hardware VOD media content storage system 204, and the hardware cloud storage system 206 which may be configured to carry out one or more operations or methods described herein. A bus interface 510 provides an interface between the bus 508 and a transceiver 512. The transceiver 512 provides communicating via the network 116 with various other apparatus, such as the plurality of published data sources 110A, . . . , 110N, the plurality of advertisement generation systems 112A, . . . , 112N, the plurality of consumer devices 114A, . . . , 114N (such as the client device 210), the distribution source device 118, the audience data source 120, and the social media server 122.

The hardware processor 504 may be configured to manage the bus 508 and general processing, including the execution of a set of instructions stored on the computer-readable medium 506. The set of instructions, when executed by the hardware processor 504, causes the media items scheduling and packaging system 102 to execute the various functions described herein for any particular apparatus. The computer-readable medium 506 may also be used for storing data that is manipulated by the hardware processor 504 when executing the set of instructions. The computer-readable medium 506 may also be configured to store data for one or more of the hardware scheduling system 104, the hardware PEMCC 106, the hardware data storage system 108, the hardware live media content storage system 202, the hardware VOD media content storage system 204, and/or the hardware cloud storage system 206.

In an aspect of the disclosure, the hardware processor 504, the computer-readable medium 506, or a combination of both may be configured or otherwise specially programmed to execute the operations or functionality of the hardware scheduling system 104, the hardware PEMCC 106, the hardware data storage system 108, the hardware live media content storage system 202, the hardware VOD media content storage system 204, and/or the hardware cloud storage system 206, or various other components described herein. For example, the hardware processor 504, computer-readable medium 506, or a combination of both may be configured or otherwise specially programmed to perform the operations and functionality of the hardware scheduling system 104, the hardware PEMCC 106, the hardware data storage system 108, the hardware live media content storage system 202, the hardware VOD media content storage system 204, and/or the hardware cloud storage system 206 as described with respect to FIGS. 1, 2, 3A, 3B, 4A and 4B.

The scheduling system 104, in conjunction with at least the PEMCC 106, the data storage system 108, the audience data source 120, and the social media server 122 in the media items scheduling and packaging system 102, provides specific improvements to the functioning of a computer, in accordance with various embodiments of the present disclosure. Existing systems require to pre-determine the buckets (or candidate spots) for the non-programming media items in the programming media content and pre-store the association of the non-programming media items for various candidate spots in the memory. In contrast, the media items scheduling and packaging system 102, in accordance with the dynamically generated schedule, generates the program stream in which the non-programming media item is inserted at run time at various candidate spots (also determined in real time) and thus, utilizes less memory than would otherwise be required as in the existing systems. Therefore, in accordance with various embodiments of the present disclosure, the media items scheduling and packaging system 102 exhibits reduced memory requirement and faster computation time (i.e. faster processing time) without sacrificing relevancy and accuracy.

Further, the scheduling system 104, in conjunction with at least the PEMCC 106, the data storage system 108, the audience data source 120, and the social media server 122 in the media items scheduling and packaging system 102, provides various improvements in the technology. In the existing systems, the buckets for the non-programming media items in the programming media content are pre-determined, and thus, may not be targeted to the preferences, and the engagement metrics, such as likes, or dislikes of users. In such scenarios, such non-programming media items may be mostly irrelevant, thus, less impactful and less effective. In contrast, the media items scheduling and packaging system 102 provides an ability to dynamically schedule the non-programming media items in the programming media content in an impactful, effective, and relevant manner for an enhanced user experience. The media items scheduling and packaging system 102 is enabled to operate more efficiently and optimally providing both an economic and a cost advantage, and at the same time ensures that a right non-programming media item is inserted at right spot for the right audience. Specifically, the media items scheduling and packaging system 102 is enabled to dynamically schedule non-programming media items and insert the non-programming media items in an existing programming media content of a channel to generate a program stream which is directly delivered over the network 116 to be viewed on one or more consumer devices 114A, . . . , 114N. The program stream in which the non-programming media item is inserted, in accordance with the dynamically generated schedule, may be more impactful as the sentiment types of the non-programming media items are synchronized with the topics of the programming media content. The media items scheduling and packaging system 102 provides increased engagement index of the users associated with the consumer plurality of devices 114A, . . . , 114N. The increased engagement index may facilitate audience retention and provides an objective function for translation of impact of the combination of the topic associated with the programming media content and the sentiment types of the non-programming media items. The media items scheduling and packaging system 102 further provides increased return of investment (ROI) for the non-programming media items, such as the advertisements, displayed based on the generated dynamic schedule. The media items scheduling and packaging system 102 further facilitates in increasing the revenues of the organization. Thus, the media items scheduling and packaging system 102 not only provides impactful programming media content to the users but also provides an enhanced user experience due to increased relevance and wider appeal of the non-programming media items.

Various embodiments of the disclosure comprise a media content scheduling and packaging system 102 that may be configured to schedule and distribute one or more channels to be viewed on a plurality of consumer devices (such as the plurality of consumer devices 114A, . . . , 114N). The media content scheduling and packaging system 102 may comprise, for example, the scheduling system 104, the PEMCC 106, and the data storage system 108. The media items scheduling and packaging system 102 may further comprise, for example, the live media content storage system 202, the VOD media content storage system 204, and the cloud storage system 206. The cloud storage system 206 may further include the live program-specific information 206A and the VOD program-specific information 206B. The scheduling system 104 may extract contextual data from program-specific information associated with programming media content of a channel received from a distribution source device 118 over the network 116. The scheduling system 104 may determine a plurality of potential non-programming media items for a plurality of users based on a match between a sentiment type of each of a plurality of non-programming media items and the extracted contextual data. The scheduling system 104 may determine a plurality of candidate spots in the programming media content based on at least the extracted contextual data and the sentiment type of each of the determined plurality of potential non-programming media items. The scheduling system 104 may dynamically generating a schedule of at least one non-programming media item from the determined plurality of potential non-programming media items for at least one candidate spot from the determined plurality of candidate spots in the programming media content of the channel to be viewed at the plurality of consumer devices (such as the plurality of consumer devices 114A, . . . , 114N). The generation of the dynamic schedule may be based on at least a set of constraints and user estimation data associated with the plurality of users.

Various embodiments of the disclosure may provide a non-transitory computer-readable medium having stored thereon, computer implemented instruction that when executed by a processor causes the media content scheduling and packaging system 102 to execute operations to schedule and distribute one or more channels to be viewed on a plurality of consumer devices (such as the plurality of consumer devices 114A, . . . , 114N). The media content scheduling and packaging system 102 may execute operations comprising extracting contextual data from program-specific information associated with programming media content of a channel received from a distribution source device 118 over the network 116. A plurality of potential non-programming media items may be determined for a plurality of users based on a match between a sentiment type of each of a plurality of non-programming media items and the extracted contextual data. Based on at least the extracted contextual data and the sentiment type of each of the determined plurality of potential non-programming media items, a plurality of candidate spots in the programming media content may be determined. A schedule of at least one non-programming media item from the determined plurality of potential non-programming media items may be dynamically generated for at least one candidate spot from the determined plurality of candidate spots in the programming media content of the channel to be viewed at the plurality of consumer devices (such as the plurality of consumer devices 114A, . . . , 114N). The generation of the dynamic schedule may be based on at least a set of constraints and user estimation data associated with the plurality of users.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all embodiments of the disclosure include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for dynamically scheduling non-programming media items in contextually relevant programming media content.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A computing system comprising memory and one or more processors communicatively coupled to the memory, the one or more processors configured to:
   extract, from a database, one or more contextual keywords from contextual data of programming media content based on a mapping of the contextual data to one or more keywords or event information associated with a semantics of the programming media content, wherein the database comprises a plurality of phrases and keywords associated with the semantics or a language of the programming media content;

determine a non-programming media item from a plurality of non-programming media items for a plurality of users based on a correspondence between a sentiment type associated with the plurality of non-programming media items and the one or more contextual keywords; and generate, based on a set of constraints, a schedule for insertion of the non-programming media item at a candidate spot in the programming media content at run time.

2. The computing system according to claim 1, wherein the non-programming media item comprise one or more of: advertisements, promotional content, or creatives.

3. The computing system according to claim 1, wherein the sentiment type is contained in meta data of the plurality of non-programming media items.

4. The computing system according to claim 1, wherein the one or more processors are further configured to:
direct presentation of the programming media content and the non-programming media item at the candidate spot in the programming media content to a user.

5. The computing system according to claim 4, wherein the one or more processors are further configured to:
determine an engagement index of the user engaging with the non-programming media item at the candidate spot in the programming media content, wherein the engagement index reflects one or more metrics and statistics associated with audience retention and impact translation for one or more different topics associated with the programming media content.

6. The computing system according to claim 5, wherein the one or more processors are further configured to:
determine a return on investment (ROI) based, at least in part, on the engagement index.

7. The computing system according to claim 1, wherein the one or more processors are further configured to:
dynamically generate the schedule of the non-programming media item at the candidate spot based on social media data associated with social media behavior of a user.

8. The computing system according to claim 1, wherein the one or more processors are further configured to:
detect an upcoming inbound trigger in the programming media content; and
determine the candidate spot in the programming media content based on the upcoming inbound trigger.

9. A computer-implemented method, comprising:
extracting, from a database, one or more contextual keywords from contextual data of programming media content based on a mapping of the contextual data to one or more keywords or event information associated with a semantics of the programming media content, wherein the database comprises a plurality of phrases and keywords associated with the semantics or a language of the programming media content;
determining a non-programming media item from a plurality of non-programming media items for a plurality of users based on a correspondence between a sentiment type associated with the plurality of non-programming media items and the one or more contextual keywords; and generating, based on a set of constraints, a schedule for insertion of the non-programming media item at a candidate spot in the programming media content at run time.

10. The computer-implemented method according to claim 9, wherein the non-programming media item comprises one or more of: advertisements, promotional content, or creatives.

11. The computer-implemented method according to claim 9, wherein the sentiment type is contained in meta data of the plurality of non-programming media items.

12. The computer-implemented method according to claim 9, further comprising:
directing presentation of the programming media content and the non-programming media item at the candidate spot in the programming media content to a user.

13. The computer-implemented method according to claim 12, further comprising:
determining an engagement index of the user engaging with the non-programming media item at the candidate spot in the programming media content, wherein the engagement index reflects one or more metrics and statistics associated with audience retention and impact translation for one or more different topics associated with the programming media content.

14. The computer-implemented method according to claim 13, further comprising:
determining a return on investment (ROI) based, at least in part, on the engagement index.

15. The computer-implemented method according to claim 9, further comprising:
dynamically generating the schedule of the non-programming media item at the candidate spot based on social media data associated with social media behavior of a user.

16. The computer-implemented method according to claim 9, further comprising:
detecting an upcoming inbound trigger in the programming media content; and
determining the candidate spot in the programming media content based on the upcoming inbound trigger.

17. A computer program product including one or more non-transitory computer-readable storage media including instructions that, when executed by one or more processors, cause the one or more processors to:
extract, from a database, one or more contextual keywords from contextual data of programming media content based on a mapping of the contextual data to one or more keywords or event information associated with a semantics of the programming media content, wherein the database comprises a plurality of phrases and keywords associated with the semantics or a language of the programming media content;
determine a non-programming media item from a plurality of non-programming media items for a plurality of users based on a correspondence between a sentiment type associated with the non-programming media item and the one or more contextual keywords; and
generate, based on a set of constraints, a schedule for insertion of the non-programming media item at a candidate spot in the programming media content at run time.

18. The computer program product according to claim 17, wherein the non-programming media item comprise one or more of: advertisements, promotional content, or creatives.

19. The computer program product according to claim 17, wherein the sentiment type is contained in meta data of the plurality of non-programming media items.

20. The computer program product according to claim 17, further comprising instructions that, when executed by one or more processors, cause the one or more processors to:
 direct presentation of the programming media content and the non-programming media item at the candidate spot in the programming media content to a user.

* * * * *